US012039857B2

(12) United States Patent
Cain (10) Patent No.: US 12,039,857 B2
(45) Date of Patent: Jul. 16, 2024

(54) MODIFIED SOUND DATA GENERATION FROM STORED SOUND DATA

(71) Applicant: Microsoft Technology Licensing, LLC, Redmond, WA (US)

(72) Inventor: Jonathan Marshall Cain, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 100 days.

(21) Appl. No.: 17/853,423

(22) Filed: Jun. 29, 2022

(65) Prior Publication Data
US 2024/0005751 A1    Jan. 4, 2024

(51) Int. Cl.
G08B 3/10    (2006.01)
G06F 3/16    (2006.01)

(52) U.S. Cl.
CPC .............. G08B 3/10 (2013.01); G06F 3/165 (2013.01)

(58) Field of Classification Search
CPC .......... G08B 3/10; G08B 3/00; G08B 3/1033; G06F 3/165; G06F 3/167; G04G 13/026; A61N 1/3993; A61N 1/39; A61N 1/3904; H03G 9/005; H03G 9/02; H03G 3/24; H03G 3/32; H03G 9/025; G10L 19/02; G10L 21/02; G10L 21/0332; H04R 2430/01
USPC ...... 340/384.5, 384.1, 384.7, 384.72, 384.73
See application file for complete search history.

(56) References Cited

U.S. PATENT DOCUMENTS

| | | | |
|---|---|---|---|
| 2004/0252848 A1* | 12/2004 | Chen ...................... | G08B 3/10 381/104 |
| 2011/0267180 A1 | 11/2011 | Ferringo et al. | |
| 2012/0146790 A1* | 6/2012 | Ladouceur ............ | H04M 19/04 455/412.2 |
| 2022/0374193 A1* | 11/2022 | Casarini ............... | H04R 1/1083 |

FOREIGN PATENT DOCUMENTS

| | | |
|---|---|---|
| JP | S57156582 A | 9/1982 |
| KR | 20120116625 A | 10/2012 |

OTHER PUBLICATIONS

"International Search Report and Written Opinion issued in PCT Application No. PCT/US23/022300", Mailed Date: Aug. 18, 2023, 13 Pages.

* cited by examiner

*Primary Examiner* — Anh V La
(74) *Attorney, Agent, or Firm* — Mannava & Kang, P.C.

(57) ABSTRACT

According to examples, an apparatus may include a processor that may determine that a first sound to be outputted responsive to an occurrence of a first event on the apparatus is to be modified, in which the first sound corresponds to a first sound data. The processor may also select, from a pool of sound data, a second sound data that is to be combined with the first sound data, in which the second sound data is associated with an occurrence of a second event on the apparatus. The processor may further combine the first sound data and the second sound data to generate a modified sound data and may use the modified sound data to output a modified sound corresponding to the modified sound data responsive to an occurrence of the first event.

20 Claims, 5 Drawing Sheets

MODIFIED SOUND DATA GENERATION FROM STORED SOUND DATA

BACKGROUND

Processors of computing devices often have access to sets of sound data that the processors use to output sounds in response to certain detected events occurring in the computing devices. For instance, the processors may use a first sound data to output a first sound in response to the occurrence of a first event on the computing devices, a second sound data may be used to output a second sound in response to the occurrence of a second event on the computing devices, etc. The events may include, for instance, a computing device waking from a sleep state, a new email message being received by the computing device, an external device being inserted into or removed from a USB port, and the like. The sounds may be, for instance, a chime sound, a ding sound, a clap sound, etc.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on. In the addition, the use of the terms "first," "second," "third," etc., are not intended to denote a specific order of elements, but instead are intended to distinguish the with respect to each other.

Computing devices are often sold and shipped with operating systems that include a finite set of sound data stored in the computing devices. The sound data is often associated with events that may occur in or on the computing devices. The processors of the computing devices may use certain ones of the sound data to play or output certain sounds when certain events occur on the computing devices. For instance, the processors may use a certain sound data that causes a certain set of musical notes to be played in response to the computing devices waking from an off, a sleep, or a hibernation state. As another example, the processors may use a certain sound data that causes a certain sound, such as a clapping or a ringing sound to be played in response to emails being received in the computing devices.

Some types of operating systems allow users to select the associations of events and sound data from a library of sound data. However, the users are limited to only those sounds corresponding to the sound data available in the library of sound data. However, some types of operating systems may allow users to import and store other sound data onto the computing devices and to assign the imported sound data to the events in or on the computing devices. In order for the users to import the sound data, the users may be required to have certain knowledge and ability with computing devices and may also be required to perform a number of steps on the computing devices. In addition, or in other examples, additional sound data may be downloaded to the computing devices by, for instance, a provider of the operating system.

In any of these instances, computing resources may be consumed in providing the additional sound data that may be used to play sounds responsive to the occurrence of events in or on the computing devices. Moreover, the additional sound data may be stored in the computing devices as additional sets of data and may thus consume storage space in the computing devices. Technical issues associated with users using and/or being provided with additional sound data corresponding to sounds that are played responsive to certain events occurring in or on computing devices may thus be that additional computing resources, including processing resources, storage resources, energy resources, and/or the like, may be consumed to provide the additional sound data on the computing devices.

Disclosed herein are apparatuses, methods, and computer-readable mediums that may enable additional sounds to be outputted from a computing device responsive to the occurrence of certain events in or on the computing device. The additional sounds may be, for instance, additional to the sounds available on the computing device when the computing device was shipped to an end user. Particularly, the additional sounds may be available for output by the computing device without having to store the sound data corresponding to the additional sounds in the computing device. Instead, as discussed herein, a processor of the computing device may combine certain ones of the existing sound data in the computing device to generate modified sound data corresponding to the additional sounds.

According to examples as discussed herein, the processor may determine that a first sound to be outputted responsive to an occurrence of a first event on a computing device is to be modified. The processor may determine that the first sound is to be modified based on, for instance, a determination that a user of the computing device indicated that the user has a hearing impairment and/or an attention-related neurodiversity. Depending on the cause of the determination that the first sound is to be modified, the processor may select a second sound data that is to be combined with a first sound data corresponding to the first sound. The first sound data and the second sound data may be included in a pool of sound data that was, for instance, originally included in the computing device when the computing device was shipped to the user.

According to examples, the processor may access information regarding predefined correlations between various causes for the first sound to be modified and various combinations of sound data. Thus, for instance, the information may define that for a certain type of hearing impairment, the first sound data is to be combined with a second sound data, while for a certain type of attention-related neurodiversity, the first sound data is to be combined with a third sound data. The information may include various other correlations of combinations of the sound data in the pool of sound data for various causes for the sounds to be modified. The correlations of the combinations of the sound data may have been determined through testing and may thus have been predefined. In some examples, the testing may enable dynamically created inclusive sound to be available for output by the computing device responsive to the occurrence of certain events in or on the computing device.

Through implementation of the features of the present disclosure, additional sound data corresponding to sounds that may enable users to better hear the sounds and/or enjoy experiences with the sounds may automatically be generated from existing sound data. That is, the additional sound data may be generated without requiring that users combine the sound data themselves or import the additional sound data into the computing device. In some examples, the additional sound data may be generated on an as-needed basis and thus, the additional sound data may not be stored as separate sound data in a computing device. As a result, the additional sound data may not consume additional resources to enable the additional sounds to be available. In other words, technical improvements afforded through implementation of the features of the present disclosure may include an improvement in the quality and quantity of sounds available to be outputted responsive to certain events occurring in or on the computing device with reduced or minimal resource consumption as compared with other techniques for providing improved sound outputs. For instance, implementation of the features of the present disclosure may include a reduction in processing resource usage, memory space usage, and energy usage.

Figure 1:
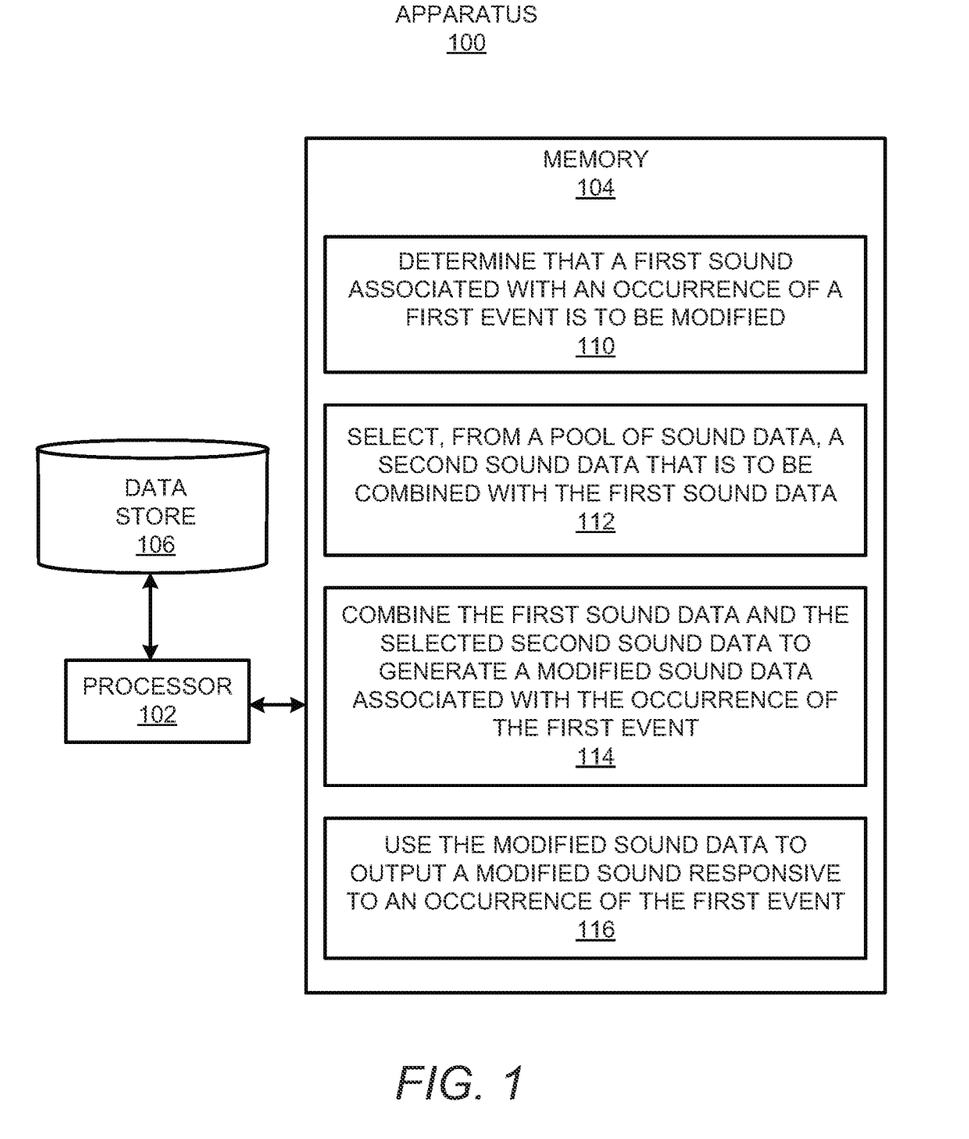
FIGS. 1 and 2, respectively, show block diagrams of an apparatus that includes a processor that may generate a modified sound data using sound data in a pool of sound data stored in a data store of the apparatus and may use the modified sound data to output a modified sound responsive to an occurrence of a first event on the apparatus, in accordance with an embodiment of the present disclosure.
Figure 2:
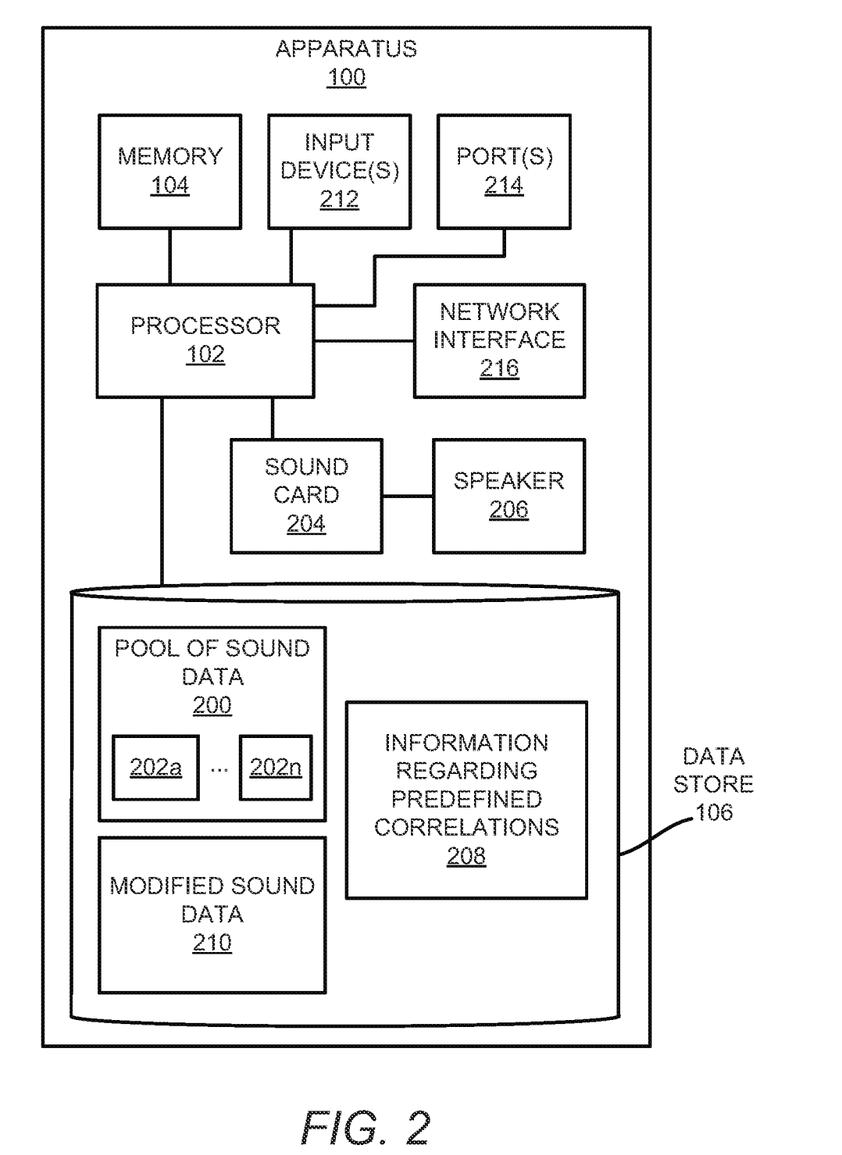

Reference is first made to FIGS. 1 and 2, which respectively show block diagrams of an apparatus 100 that may include a processor 102 that may generate a modified sound data 210 using sound data 202a-202n in a pool of sound data 200 stored in a data store 106 of the apparatus 100 and may use the modified sound data 210 to output a modified sound responsive to an occurrence of a first event on the apparatus 100, in accordance with an embodiment of the present disclosure. It should be understood that the apparatus 100 depicted in FIGS. 1 and 2 may include additional features and that some of the features described herein may be removed and/or modified without departing from the scope of the apparatus 100.

As shown in FIGS. 1 and 2, the apparatus 100 may include a processor 102 that may control operations of the apparatus 100. It should be understood that references made herein to the apparatus 100 performing various operations should equivalently be construed as meaning that the processor 102 of the apparatus 100 may perform those various operations. The apparatus 100 may also include a memory 104 on which instructions that the processor 102 may access and/or may execute may be stored. In addition, the processor 102 may include a data store 106 on which the processor 102 may store and access various information as discussed herein. The processor 102 may be a semiconductor-based microprocessor, a central processing unit (CPU), an application specific integrated circuit (ASIC), a field-programmable gate array (FPGA), and/or other hardware device.

Although the apparatus 100 is depicted as having a single processor 102, it should be understood that the apparatus 100 may include additional processors and/or cores without departing from a scope of the apparatus 100. In this regard, references to a single processor 102 as well as to a single memory 104 may be understood to additionally or alternatively pertain to multiple processors 102 and/or multiple memories 104. In addition, or alternatively, the processor 102 and the memory 104 may be integrated into a single component, e.g., an integrated circuit on which both the processor 102 and the memory 104 may be provided.

The memory 104 and the data store 106, which may also each be termed a computer readable medium, may each be a Random Access memory (RAM), an Electrically Erasable Programmable Read-Only Memory (EEPROM), a storage device, or the like. The memory 104 and/or the data store 106 may be a non-transitory computer readable storage medium, where the term "non-transitory" does not encompass transitory propagating signals.

Generally speaking, the apparatus 100 may be a computing device such as a laptop computer, a desktop computer, a tablet computer, a smartphone, and/or the like. As shown in FIG. 2, a pool of sound data 200 may be stored in the data store 106 (or another storage device accessible to the processor 102). The pool of sound data 200 may include respective sets of data that the processor 102 may use to cause the respective sounds to be outputted or played. The pool of sound data 200 may include sound data 202a-202n (the variable "n" may represent a value that is greater than 1) that the processor 102 may use to cause certain sounds to be played (or, equivalently) outputted when certain events on the apparatus 100 occur. In some examples, the processor 102 may output the sound data 202a-202n to a sound card 204 that may convert the sound data 202a-202n into analog signals that a speaker 206 may use to produce sounds corresponding to the sound data 202a-202n.

According to examples, the processor 102 may use a first sound data 202a to output a first sound when the apparatus 100 is turned on and/or when the apparatus 100 is woken from a sleep or hibernation state. As another non-limiting example, the processor 102 may use a second sound data 202b to output a second sound when the apparatus 100 undergoes a shutdown process or enters into a sleep mode. The processor 102 may use a third sound data 202c to output a third sound when an external device is inserted into a universal serial bus (USB) port of the apparatus 100. The processor 102 may use a fourth sound data 202d to output a fourth sound in response to a new email being received in the apparatus 100. The processor 102 may use a fifth sound data 202e to output a fifth sound in response to receipt of a new text message. The processor 102 may use a sixth sound data 202f to output a sixth sound in response to an alarm being triggered. The processor 102 may use additional sound data 202g-202n to output additional sounds in response to other events and/or triggers. It should be understood that the listing of specific types of sound data and events are for purposes of illustration and thus should not be construed as being exhaustive or limiting in any respect.

The sound data 202a-202n in the pool of sound data 200 and the associations between the sound data 202a-202n and the events that trigger the use of the sound data 202a-202n may be stored in the data store 106 when, for instance, an operating system is installed in the apparatus 100. In other examples, the pool of sound data 200 and the associations between the sound data 202a-202n and the events that trigger the use of the sound data 202a-202n may be stored in the data store 106 at another time prior to or after the apparatus 100 is delivered to a user of the apparatus 100. In any of these examples, the pool of sound data 200 may be available for use during an initial operation of the apparatus 100 by a user.

Various non-limiting examples of the sounds corresponding to the sound data 202a-202n may include, a clapping sound, a doorbell sound, a chime sound, a sound with an increasing pitch, a sound with a decreasing pitch, a drum beat, musical notes, etc. In any of these examples, the sounds may have relatively short durations of time. For instance, the sounds may have durations of time that may include and be between any time duration that is less than a second and about 5 seconds.

As shown in FIG. 1, the memory 104 may have stored thereon machine-readable instructions 110-116 that the processor 102 may execute. The processor 102 may execute the instructions 110 to determine that a first sound corresponding to a first sound data 202a to be outputted responsive to an occurrence of a first event is to be modified. The processor 102 may determine that the first sound is to be modified based on the occurrence of a sound triggering event. The sound triggering event may be a setting selected by a user of the apparatus 100, a condition detected around the apparatus 100, a time of day, a certain day of the week, and/or the like.

A user of the apparatus 100 may select a setting through input of an instruction through one or more input devices 212, such as a mouse, a keyboard, a microphone, a camera, and/or the like. The apparatus 100 may also include one or more ports 214, such as USB ports, through which external devices may be connected to the apparatus 100. The apparatus 100 may further include a network interface 216 through which the apparatus 100 may communicate with components over a network, such as a local area network, the Internet, or a combination thereof.

In some examples, the processor 102 may determine that the first event on the apparatus 100 has occurred and may determine that the first sound is to be modified following the occurrence of the first event on the apparatus 100. In other examples, the processor 102 may determine that the first sound is to be modified prior to the occurrence of the first event on the apparatus 100.

In some examples, the processor 102 may provide a user of the apparatus 100 with a number of options from which the user may select, for instance, in a settings page of the apparatus 100. The options may include selections of various types of hearing impairments, such as loss of or diminished ability to hear higher pitched sounds, loss of or diminished ability to hear lower pitched sounds, and/or the like. The options may also or additionally include selections of various types of attention-related neurological diversity options. In addition, or alternatively, the options may include options for various types of themes, such as a science fiction theme, an electronic theme, an early 1980's theme, a more dramatic theme, a less dramatic theme, and/or the like. In any of these examples, the processor 102 may determine that the user selected one of the options and based on that determination, the processor 102 may determine that a first sound associated with an occurrence of a first event is to be modified.

In some examples, the processor 102 may determine a condition around the apparatus 100. For instance, the processor 102 may determine an ambient noise level around the apparatus 100, a ambient light level around the apparatus 100, and/or the like. By way of example, the apparatus 100 may collect ambient noise through receipt of sounds through a microphone in the apparatus 100, from an external device (not shown) that may have collected the ambient noise, from an input of the ambient noise level from an end user, and/or the like. As another example, the apparatus 100 may include a camera through which ambient light may be collected and the processor 102 may determine the ambient light level from the collected ambient light. In these examples, the processor 102 may compare the detected condition against a predefined threshold condition. The processor 102 may determine that the first sound associated with an occurrence of the first event on the apparatus 100 is to be modified based on the detected condition exceeding or falling below the predefined threshold condition. The predefined threshold condition may depend on the condition and may be set based on testing, modeling, and/or the like of various conditions and sounds.

The processor 102 may execute the instructions 112 to, based on the determination that the first sound is to be modified, select, from the pool of sound data 200, a second sound data 202b that is to be combined with the first sound data 202a. As discussed herein, the second sound data 202b is associated with an occurrence of a second event on the apparatus 100. In some examples, the processor 102 may identify a cause for the determination that the first sound is to be modified and may select the second sound data 202b from the pool of sound data 200 based on the identified cause for the determination that the first sound is to be modified. In these examples, the processor 102 may access information that includes predefined correlations 208 between the sound data 202a-202n in the pool of sound data 200, a plurality of causes for the determination that the first sound is to be modified, and combinations of modified sound data 210 corresponding to the plurality of causes. In addition, the processor 102 may select the second sound data 202b from the pool of sound data 200 based on the predefined correlations included in the accessed information 208.

According to examples, the correlations between the sound data 202a-202n, the plurality of causes for the determination that the first sound is to be modified, and the combinations of modified sound data 210 may be determined through testing and/or modeling of various combinations of modified sound data 210. For instance, the first sound data 202a may be combined with other ones of the sound data 202b-202n and the combined sound data (or equivalently, modified sound data 210) may be analyzed to determine which of the combinations result in desired and/or improved properties over of the first sound data 202a. The desired and/or improved properties may include, for instance, an improved ability by people with certain types of impaired hearing to hear the sound corresponding to the modified sound data 210. The desired and/or improved properties may also or alternatively include an improved experience in hearing the sound corresponding to the modified sound data 210 by those people that experience impaired hearing. The improved experience in hearing the sound may include an improved aesthetic quality of the sound. The desired and/or improved properties may include, for instance, an output that better corresponds to a selected attention-related neurological diversity choice by a user.

As other examples, the desired and/or improved properties may include an improved ability to hear the sound corresponding to the modified sound data 210 in certain ambient sound conditions. For instance, the desired and/or improved properties may include an improved ability to hear the sounds when there are relatively loud noises around an apparatus through which the sounds are being outputted. In addition or alternatively, the desired and/or improved properties may include an improved ability to hear the sounds when there are relatively high-pitched or relatively low-pitched noises around the apparatus 100.

As yet other examples, the desired and/or improved properties may include the sounds corresponding to certain themes or modes. For instance, the desired and/or improved properties may include sounds that better correspond to certain themes such as a science fiction theme, an anime theme, and/or the like. The desired and/or improved properties may include sounds that better correspond to certain modes such as a dark mode in which sounds are quieter and more soothing and a light mode in which sounds are sharper.

In any of the examples above, various combinations of the sound data 202a-202n may be used to determine the combined sound data. In some examples, the various combinations may be random combinations of the sound data 202a-202n and each possible combination of the sound data 202a-202n may be tested. In other examples, the various combinations may be based on known characteristics of the sound data 202a-202n. For instance, certain characteristics of the sound data 202a-202n, such as pitch, tone, frequency, etc., may be used to determine which of the combinations of the sound data 202a-202n are likely to result in the desired and/or improved properties. In these examples, only those combinations of sound data 202a-202n may be tested.

In any of the examples above, determinations as to which of the combined sound data results in the desired and/or improved properties may be made through testing of the combined sound data with test groups of people. In some instances, the test groups of people may include people who have certain types hearing impairments. In addition, the information regarding the predefined correlations 208 between the sound data 202a-202n in the pool of sound data 200, a plurality of causes for the determination that the first sound is to be modified, and combinations of modified sound data 210 corresponding to the plurality of causes may be stored in the data store 106. The information regarding the predefined correlations 208 may be stored in the data store 106 prior to the apparatus 100 being delivered to an end user of the apparatus 100. In other examples, the information 208 regarding the predefined correlations may be stored in the data store 106 following the apparatus 100 being delivered to a user of the apparatus 100, for instance, as a downloaded file.

The processor 102 may execute the instructions 114 to combine the first sound data 202a and the selected second sound data 202b to generate a modified sound data 210 associated with the occurrence of the first event. The processor 102 may combine the first sound data 202a and the selected second sound data 202b by overlaying the selected second sound data 202b over the first sound data 202a. In some examples, the processor 102 may identify at least one moment in the first sound data 202a at which the selected second sound data 202b is to be added. The processor 102 may also add the selected second sound data 202b to the identified at least one moment in the first sound data 202a to combine the selected second sound data 202b with the first sound data 202a. The at least one moment at which the selected second sound data 202b is to be added may have been predefined, for instance, through testing of combinations in which the second sound data 202b is added to various moments, e.g., in time, in the first sound data 202a. The at least one moment in the first sound data 202a at which the selected second sound data 202b is to be added may correspond to at least one moment that results in the modified sound data 210 having any of the desired and/or improved properties discussed above. In addition, identification of the at least one moment may be included in the information regarding the predefined correlations 208.

Figure 3A:
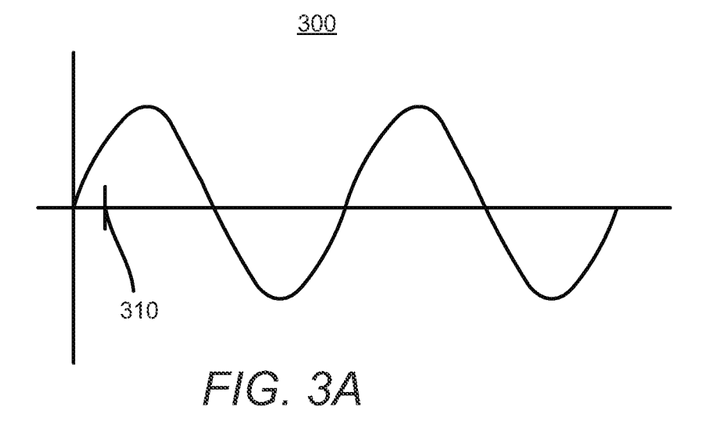
FIGS. 3A-3C, respectively show diagrams of templates of a first sound data, a second sound data, and a modified sound data, in accordance with an embodiment of the present disclosure.
Figure 3B:
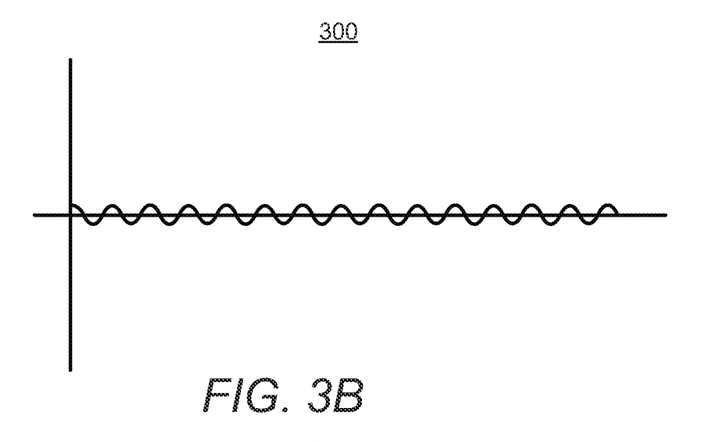
Figure 3C:
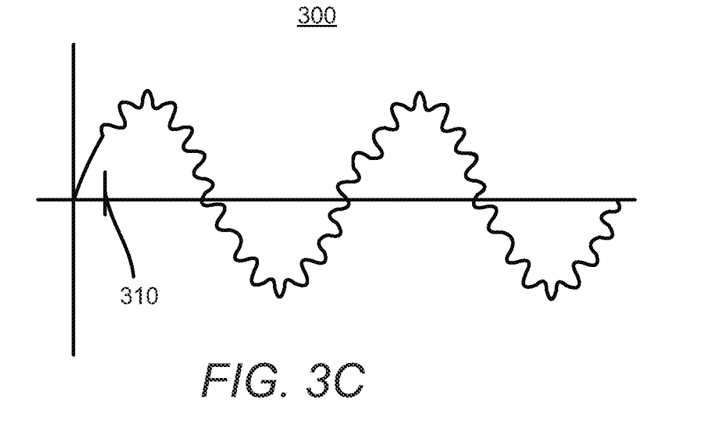

With reference now to FIGS. 3A-3C, there are respectively shown diagrams of templates 300, 302, 304 of a first sound data 202a, a second sound data 202b, and a modified sound data 210, in accordance with an embodiment of the present disclosure. It should be understood that the diagrams of the templates 300, 302, 304 are for purposes of illustration and should thus not be construed as limiting the present disclosure in any respect.

FIGS. 3A-3C respectively show the templates 300, 302, 304 as graphs of sound waves in which the X axis denotes time and the Y axis denotes amplitude. As shown in FIG. 3A, the template 300 of the first sound data 202a may indicate at least one moment 310 in the first sound data 202a at which the selected second sound data 202b is to be added to the first sound data 202a. The processor 102 may identify the at least one moment 310 in the first sound data 202a at which the selected second sound data 202b is to be added to the first sound data 202a from the accessed template 300 of the first sound data 202a. In addition, the processor 102 may add the selected second sound data 202b to the identified at least one moment 310 in the first sound data 202a to combine the selected second sound data 202b with the first sound data 202a as shown in FIG. 3C. The processor 102 may store the modified sound data 210 in the data store 106 such that the modified sound data 210 may be accessed and used to generate a modified sound responsive to an occurrence of the first event.

With reference back to FIG. 1, the processor 102 may execute the instructions 116 to use the modified sound data 210 to output a modified sound corresponding to the modified sound data 210 responsive to an occurrence of the first event. For instance, in response to the first event occurring, the processor 102 may output the modified sound data 210 to the sound card 204. The sound card 204 may convert the modified sound data 210 into analog signals that the speaker 206 may play to produce sounds corresponding to the modified sound data 210.

According to examples, the processor 102 may determine that a plurality of sounds associated with occurrences of a plurality of events on the apparatus 100 are to be modified, in which the plurality of sounds correspond to respective sound data 202a-202n. The processor 102 may also, based on the determination that the plurality of sounds are to be modified, select, from the pool of sound data 200, other sound data 202a-202n that are to respectively be combined with the respective sound data 202a-202n. The processor 102 may further respectively combine the plurality of sound data 202a-202n with the selected other sound data 202a-202n to generate a plurality of modified sound data 210. In addition, the processor 102 may store the plurality of modified sound data 210 in the data store 106. The processor 102 may use the plurality of modified sound data 210 to output respective sounds responsive to occurrences of the plurality of events.

In some examples, the processor 102 may combine more than two of the sound data 202a-202n to generate the modified sound data 210. The determinations of which and the number of sound data 202a-202n to combine may be based on testing of various combinations of the sound data 202a-202 as discussed herein.

Although the instructions 110-116 are described herein as being stored on the memory 104 and may thus include a set of machine-readable instructions, the apparatus 100 may include hardware logic blocks that may perform functions similar to the instructions 110-116. For instance, the processor 102 may include hardware components that may execute the instructions 110-116. In other examples, the apparatus 100 may include a combination of instructions and hardware logic blocks to implement or execute functions corresponding to the instructions 110-116. In any of these examples, the processor 102 may implement the hardware logic blocks and/or execute the instructions 110-116. As discussed herein, the apparatus 100 may include additional instructions and/or hardware logic blocks such that the processor 102 may execute operations in addition to or in place of those discussed above with respect to FIG. 1.

Figure 4:
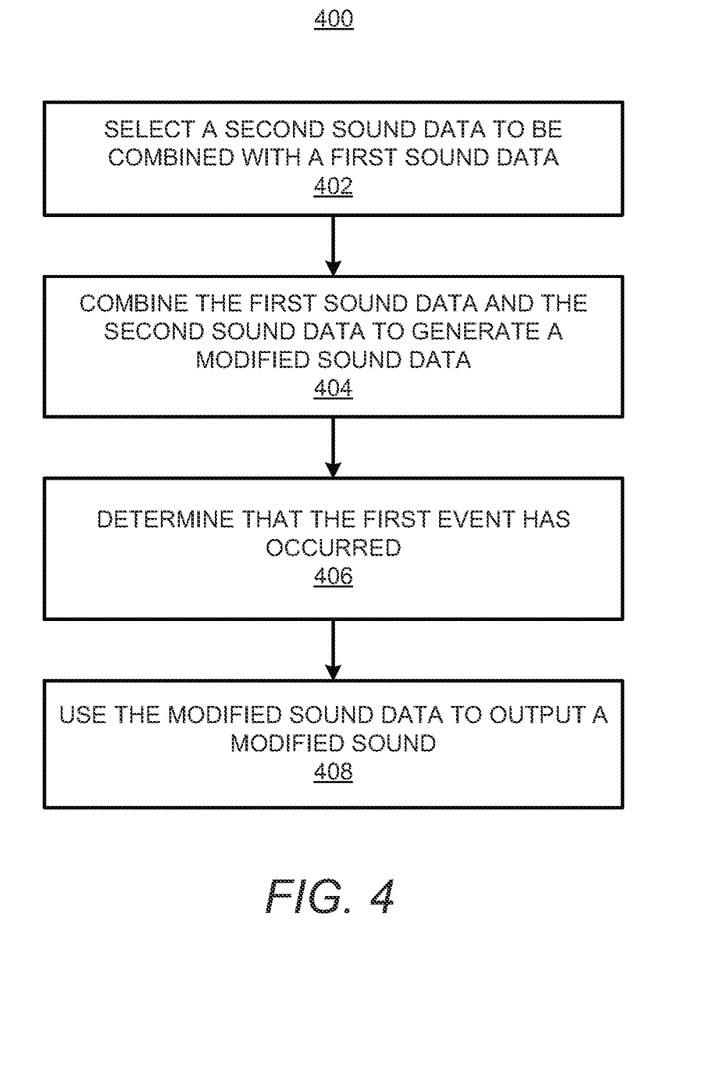
FIG. 4 depicts a flow diagram of a method for generating a modified sound data using sound data in a pool of sound data stored in a data store of an apparatus and using the modified sound data responsive to an occurrence of a first event on the apparatus, in accordance with an embodiment of the present disclosure.

Various manners in which the processor 102 of the apparatus 100 may operate are discussed in greater detail with respect to the method 400 depicted in FIG. 4. Particularly, FIG. 4 depicts a flow diagram of a method 400 for generating a modified sound data 210 using sound data 202a-202n in a pool of sound data 200 stored in a data store 106 of an apparatus 100 and using the modified sound data 210 responsive to an occurrence of a first event on the apparatus 100, in accordance with an embodiment of the present disclosure. It should be understood that the method 400 may include additional operations and that some of the operations described therein may be removed and/or modified without departing from the scope of the method 400. The description of the method 400 is made with reference to the features depicted in FIGS. 1-3 for purposes of illustration.

At block 402, the processor 102 may select a second sound data 202b to be combined with a first sound data 202a. The first sound data 202a and the second sound data 202b may be stored in a pool of sound data 200 stored in a data store 106 of an apparatus 100. As discussed herein, the first sound data 202a may be used to generate a first sound responsive to an occurrence of a first event on the apparatus 100 and the second sound data 202b may be used to generate a second sound responsive to an occurrence of a second event on the apparatus 100. As also discussed herein, the processor 102 may access information 208 that includes predefined correlations between sound data 202a-202n in the pool of sound data 200 and combinations of modified sound data 210. In addition, the processor 102 may select the second sound data 202b from the pool of sound data 200 based on the predefined correlations included in the accessed information 208.

At block 404, the processor 102 may combine the first sound data 202a and the second sound data 202b to generate a modified sound data 210 to be outputted responsive to the occurrence of the first event. The processor 102 may identify at least one moment 310 (FIG. 3) in the first sound data 202a at which the selected second sound data 202b is to be added. The processor 102 may also add the selected second sound data 202b to the identified at least one moment 310 in the first sound data 202a to combine the selected second sound data 202b with the first sound data 202a. Particularly, for instance, the processor 102 may access a template 300 of the first sound data 202a that indicates the at least one moment 310 in the first sound data 202a at which the selected second sound data 202b is to be added to the first sound data 202a. In addition, the processor 102 may identify the at least one moment 310 in the first sound data 202a at which the selected second sound data 202b is to be added to the first sound data 202a from the accessed template 300.

At block 406, the processor 102 may determine that the first event has occurred. In addition, at block 408, the processor 102 may use the modified sound data 210 to output a modified sound corresponding to the modified sound data 210 responsive to the occurrence of the first event. Particularly, the processor 102 may send the modified sound data 210 to a sound card 204, which may convert the modified sound data 210 into analog signals that may cause the speaker 206 to output the modified sound.

In some examples, the processor 102 may store the modified sound data 210 in a data store 106 and the processor 102 may, responsive to another occurrence of the first event, access the modified sound data 210 stored in the data store 106 and use the modified sound data 210 to output the modified sound.

In some examples, the processor 102 may determine that a plurality of sounds associated with occurrences of a plurality of events on the apparatus 100 are to be modified, in which the plurality of sounds correspond to respective sound data 202a-202n. The processor 102 may, based on the determination that the plurality of sounds are to be modified, select, from the pool of sound data 200, other sound data 202a-202n that are to respectively be combined with the respective sound data 202a-202n. The processor 102 may also respectively combine the plurality of sound data 202a-202n with the selected other sound data 202a-202n to generate a plurality of modified sound data 210. In addition, the processor 102 may store the plurality of modified sound data 210 and may use the plurality of modified sound data 210 to output respective modified sounds responsive to occurrences of the plurality of events.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
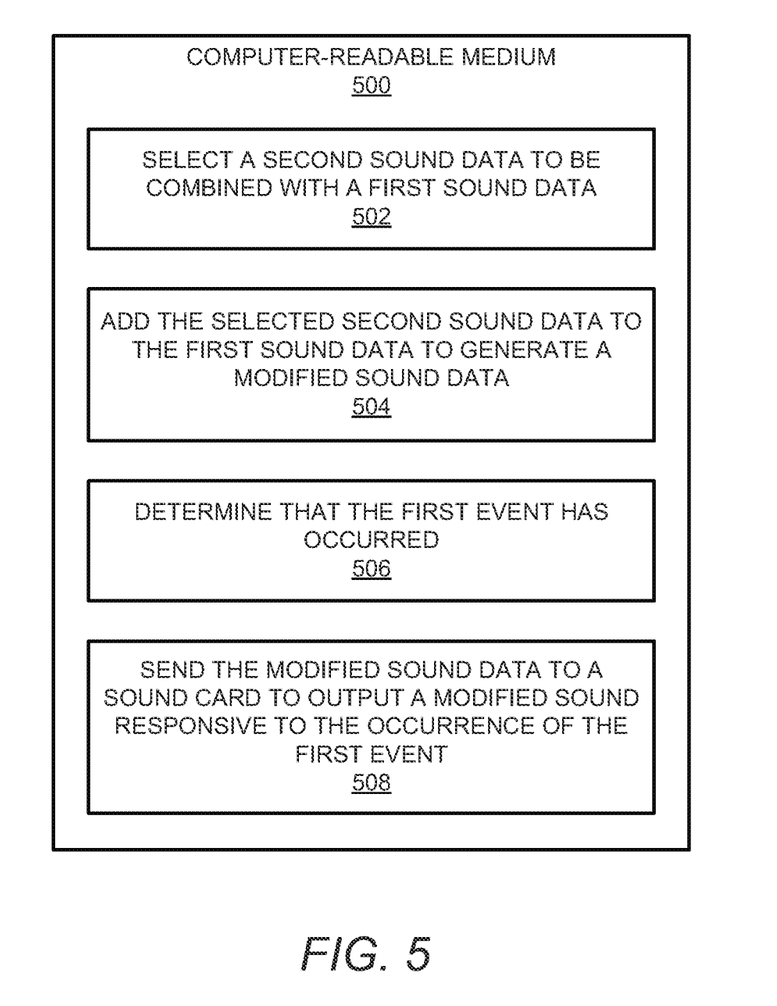
FIG. 5 shows a block diagram of a computer-readable medium that may have stored thereon computer-readable instructions for generating a modified sound data using sound data in a pool of sound data stored in a data store of an apparatus and using the modified sound data responsive to an occurrence of a first event on the apparatus, in accordance with an embodiment of the present disclosure.

Turning now to FIG. 5, there is shown a block diagram of a computer-readable medium 500 that may have stored thereon computer-readable instructions for generating a modified sound data 210 using sound data 202a-202n in a pool of sound data 200 stored in a data store 106 of an apparatus 100 and using the modified sound data 210 responsive to an occurrence of a first event on the apparatus 100, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-508 that a processor, such as the processor 102 of the apparatus 100 depicted in FIGS. 1-3, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to select a second sound data 202b to be combined with a first sound data 202a, in which the first sound data 202a and the second sound data 202b are stored in a pool of sound data 200. As discussed herein, the pool of sound data 200 may be stored in a data store 106 of an apparatus 100. The first sound data 202a is to be used to generate a first sound responsive to an occurrence of a first event on the apparatus 100 and the second sound data 202b is to be used to generate a second sound responsive to an occurrence of a second event on the apparatus 100. In some examples, the processor may access information 208 that includes predefined correlations between sound data 202a-202n in the pool of sound data 200 and combinations of modified sound data 210. In addition, the processor may select the second sound data 202b from the pool of sound data 200 based on the predefined correlations included in the accessed information 208.

The processor may fetch, decode, and execute the instructions 504 to add the selected second sound data 202b to the first sound data 202a to generate a modified sound data 210 to be outputted responsive to the occurrence of the first event. For instance, the processor may identify at least one moment 310 in the first sound data 202a at which the selected second sound data 202b is to be added and may add the selected second sound data 202b to the identified at least one moment 310 in the first sound data 202a to combine the selected second sound data 202b with the first sound data 202a.

The processor may fetch, decode, and execute the instructions 506 to determine that the first event has occurred. In addition, the processor may send the modified sound data 210 to a sound card 204 to output a modified sound corresponding to the modified sound data 210 responsive to the occurrence of the first event.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a data store storing a pool of sound data, wherein the pool of sound data includes a first sound data to be used to generate a first sound when a first event on the apparatus occurs and a second sound data to be used to generate a second sound when a second event on the apparatus occurs;
   a processor; and
   a memory on which is stored machine-readable instructions that when executed by the processor, cause the processor to:
      determine that the first sound to be outputted responsive to an occurrence of the first event on the apparatus is to be modified as a result of a certain cause, wherein the first sound corresponds to the first sound data;
      based on the certain cause of the determination that the first sound is to be modified, select, from the pool of sound data, the second sound data to modify the first sound data based on a predefined correlation between the first sound data and the second sound data for the certain cause;
      modify the first sound data with the second sound data to generate a modified sound data to be outputted responsive to the occurrence of the first event; and
      use the modified sound data to output a modified sound of the first sound responsive to an occurrence of the first event on the apparatus.

2. The apparatus of claim 1, wherein the instructions cause the processor to:
   access information that includes predefined correlations between a plurality of sound data in the pool of sound data, a plurality of causes, including the certain cause, for the determination that the first sound is to be modified, and combinations of modified sound data corresponding to the plurality of causes; and
   select the second sound data from the pool of sound data based on the predefined correlations included in the accessed information.

3. The apparatus of claim 1, wherein the instructions cause the processor to:
   determine that the first event on the apparatus has occurred; and
   determine that the first sound is to be modified following the occurrence of the first event on the apparatus.

4. The apparatus of claim 1, wherein the instructions cause the processor to:
   determine that the first sound is to be modified prior to the occurrence of the first event on the apparatus.

5. The apparatus of claim 1, wherein, to modify the first sound data with the selected second sound data, the instructions cause the processor to:
   identify at least one moment in the first sound data at which the selected second sound data is to be added; and
   add the selected second sound data to the identified at least one moment in the first sound data to combine the selected second sound data with the first sound data.

6. The apparatus of claim 5, wherein the instructions cause the processor to:
   access a template of the first sound data that indicates the at least one moment in the first sound data at which the selected second sound data is to be added to the first sound data; and
   identify the at least one moment in the first sound data at which the selected second sound data is to be added to the first sound data from the accessed template.

7. The apparatus of claim 1, further comprising:
a data store; and
wherein the pool of sound data is stored in the data store and wherein a plurality of sound data in the pool of sound data are assigned to respective ones of a plurality of events that are to occur on the apparatus.

8. The apparatus of claim 1, wherein the instructions cause the processor to:
store the modified sound data in a data store; and
responsive to another occurrence of the first event,
access the modified sound data stored in the data store; and
use the modified sound data to output the modified sound.

9. The apparatus of claim 1, wherein the instructions cause the processor to:
determine that a plurality of sounds associated with occurrences of a plurality of events on the apparatus are to be modified, wherein the plurality of sounds respectively correspond to a plurality of sound data in the pool of sound data;
based on the determination that the plurality of sounds are to be modified, select, from the pool of sound data, other sound data that are to respectively be combined with the plurality of sound data;
respectively combine the plurality of sound data with the selected other sound data to generate a plurality of modified sound data; and
store the plurality of modified sound data, wherein the plurality of modified sound data are to be used to output respective sounds responsive to occurrences of the plurality of events.

10. A method for modifying sounds using a pool of sound data in an apparatus, wherein the pool of sound data in the apparatus includes a first sound data to be used to generate a first sound when a first event on the apparatus occurs and a second sound data to be used to generate a second sound when a second event on the apparatus occurs, the method comprising:
in response to a determination that the first sound is to be modified as a result of a certain cause, selecting, by a processor, the second sound data to modify the first sound data based on a predefined correlation between the first sound data and the second sound data for the certain cause;
modifying, by the processor, the first sound data with the second sound data to generate a modified sound data to be outputted responsive to the occurrence of the first event on the apparatus;
determining, by the processor, that the first event on the apparatus has occurred; and
using, by the processor, the modified sound data to output a modified sound corresponding to the modified sound data responsive to the occurrence of the first event on the apparatus.

11. The method of claim 10, further comprising:
accessing information that includes predefined correlations between a plurality of sound data in the pool of sound data, a plurality of causes, including the certain cause, for the determination that the first sound is to be modified, and combinations of modified sound data corresponding to the plurality of causes; and
selecting the second sound data from the pool of sound data based on the predefined correlations included in the accessed information.

12. The method of claim 10, further comprising:
selecting the second sound data to modify the first sound data following a determination that the first event has occurred.

13. The method of claim 10, modifying the first sound data with the selected second sound data comprises:
identifying at least one moment in the first sound data at which the selected second sound data is to be added; and
adding the selected second sound data to the identified at least one moment in the first sound data to combine the selected second sound data with the first sound data.

14. The method of claim 13, further comprising:
accessing a template of the first sound data that indicates the at least one moment in the first sound data at which the selected second sound data is to be added to the first sound data; and
identifying the at least one moment in the first sound data at which the selected second sound data is to be added to the first sound data from the accessed template.

15. The method of claim 10, further comprising:
storing the modified sound data in a data store; and
responsive to another occurrence of the first event,
accessing the modified sound data stored in the data store; and
using the modified sound data to output the modified sound.

16. The method of claim 10, further comprising:
determining that a plurality of sounds associated with occurrences of a plurality of events on the apparatus are to be modified, wherein the plurality of sounds respectively correspond to a plurality of sound data in the pool of sound data;
based on the determination that the plurality of sounds are to be modified, selecting, from the pool of sound data, other sound data that are to respectively be combined with the plurality of sound data;
respectively combining the plurality of sound data with the selected other sound data to generate a plurality of modified sound data; and
storing the plurality of modified sound data, wherein the plurality of modified sound data are to be used to output respective sounds responsive to occurrences of the plurality of events.

17. A computer-readable storage device on which is stored computer-readable instructions that when executed by a processor of an apparatus, cause the processor to:
store a pool of sound data, wherein the pool of sound data includes a first sound data to be used to generate a first sound when a first event on the apparatus occurs and a second sound data to be used to generate a second sound when a second event on the apparatus occurs;
in response to a determination that the first sound is to be modified as a result of a certain cause, select the second sound data from the pool of sound data to modify the first sound data based on a predefined correlation between the first sound data and the second sound data for the certain cause;
modify the first sound data with the selected second sound data to generate a modified sound data to be outputted responsive to the occurrence of the first event;
determine that the first event on the apparatus has occurred; and
send the modified sound data to a sound card to output a modified sound corresponding to the modified sound data responsive to the occurrence of the first event on the apparatus.

18. The computer-readable storage device of claim 17, wherein the instructions further cause the processor to:
   access information that includes predefined correlations between a plurality of sound data in the pool of sound data, a plurality of causes, including the certain cause, for the determination that the first sound is to be modified, and combinations of modified sound data corresponding to the plurality of causes; and
   select the second sound data from the pool of sound data based on the predefined correlations included in the accessed information.

19. The computer-readable storage device of claim 17, wherein, to modify the first sound data with the selected second sound data, the instructions cause the processor to:
   identify at least one moment in the first sound data at which the selected second sound data is to be added; and
   add the selected second sound data to the identified at least one moment in the first sound data to combine the selected second sound data with the first sound data.

20. The computer-readable storage device of claim 17, wherein the instructions further cause the processor to:
   determine that a plurality of sounds associated with occurrences of a plurality of events on the apparatus are to be modified, wherein the plurality of sounds respectively correspond to a plurality of sound data in the pool of sound data;
   based on the determination that the plurality of sounds are to be modified, select, from the pool of sound data, other sound data that are to respectively be combined with the plurality of sound data;
   respectively combine the plurality of sound data with the selected other sound data to generate a plurality of modified sound data; and
   store the plurality of modified sound data, wherein the plurality of modified sound data are to be used to output respective sounds responsive to occurrences of the plurality of events.

\* \* \* \* \*